(12) United States Patent
Choi et al.

(10) Patent No.: US 9,112,966 B2
(45) Date of Patent: Aug. 18, 2015

(54) MOBILE DEVICE AND METHOD FOR CONTROLLING OPERATION OF MOBILE DEVICE

(75) Inventors: Jae-Young Choi, Goyang-si (KR); Gwang-Hee Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 425 days.

(21) Appl. No.: 13/546,335

(22) Filed: Jul. 11, 2012

(65) Prior Publication Data

US 2013/0222435 A1 Aug. 29, 2013

(30) Foreign Application Priority Data

Feb. 29, 2012 (KR) .................. 10-2012-0021397

(51) Int. Cl.
- *G09G 5/00* (2006.01)
- *H04M 1/2745* (2006.01)
- *G06F 3/0482* (2013.01)
- *G06F 3/0485* (2013.01)
- *G06F 3/0488* (2013.01)

(52) U.S. Cl.
CPC ....... *H04M 1/274583* (2013.01); *G06F 3/0482* (2013.01); *G06F 3/0485* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 2006/0256135 A1* | 11/2006 | Aoyama et al. | 345/629 |
| 2010/0311445 A1* | 12/2010 | Kim | 455/466 |
| 2011/0084921 A1* | 4/2011 | Kang et al. | 345/173 |
| 2011/0247015 A1* | 10/2011 | Hoshino et al. | 719/321 |

FOREIGN PATENT DOCUMENTS

| | | |
|---|---|---|
| EP | 2261784 | 12/2010 |
| EP | 2309707 | 4/2011 |
| KR | 10-2007-0096274 | 10/2007 |
| KR | 10-2009-0083126 | 8/2009 |
| KR | 10-2009-0088597 | 8/2009 |
| KR | 10-2010-0020818 | 2/2010 |
| KR | 10-2010-0035474 | 4/2010 |
| KR | 10-2011-0037298 | 4/2011 |
| KR | 10-2011-0038371 | 4/2011 |
| KR | 10-2011-0060447 | 6/2011 |

OTHER PUBLICATIONS

European Search Report submitted with European Application 12184068 dated May 21, 2013.

* cited by examiner

*Primary Examiner* — Jwalant Amin
(74) *Attorney, Agent, or Firm* — H.C. Park & Associates, PLC

(57) ABSTRACT

A mobile device includes a memory to store multiple items of a first list; a touch screen to display the first list including the multiple items, to display a second list including at least one of a selection data, and to receive an input to scroll the first list; and a control unit to set a selection condition of at least one of the items of the first list, to detect whether the at least one of the items of the first list is located in a shift region, and to shift the at least one of the items of the first list located in the shift region to a second list if the at least one of the items of the first is determined to correspond to the selection condition.

20 Claims, 19 Drawing Sheets

MOBILE DEVICE AND METHOD FOR CONTROLLING OPERATION OF MOBILE DEVICE

CROSS-REFERENCE TO RELATED APPLICATION

This application claims the priority from and the benefit under 35 U.S.C. §119(a) of Korean Patent Application No. 10-2012-0021397, filed on Feb. 29, 2012, the disclosure of which is incorporated by reference in its entirety for all purposes.

BACKGROUND

1. Field

The following description relates to a mobile device, and in particular, to a method for selecting target data from a plurality of data displayed on a touch screen of the mobile device.

2. Discussion of the Background

With the development of information communication technology, types of electronic devices have become diversified. Diversification of the types of electronic devices may be remarkable in mobile electronic devices, such as mobile devices, as well as in stationary electronic devices. For example, cellular phones, MP3 players, digital cameras, portable multimedia players (PMPs), navigation devices, portable game players, electronic dictionaries, e-book readers, and digital multimedia broadcasting (DMB) receivers may have already been popularized. Of late, smart phones and tablet computers may be gaining popularity as new mobile devices.

Further, capabilities of mobile devices have become more diversified as well, the mobile devices becoming more technologically advanced and multifunctional. A representative mobile terminal with these characteristics may include a smart phone or a tablet computer. Smart phones and tablet computers may have evolved into integrated electronic devices equipped with various capabilities, including a calling capability, a data storing capability, a multimedia playback capability, a word processing capability, a gaming capability, a broadcast receiving capability, an Internet access capability, a camera capability, and the like.

In terms of hardware and software, various attempts have been made on mobile devices to the integration and advancement of these components, including attempts to implement various user interfaces as well as design changes. In particular, user interfaces of mobile devices may be evolving to become more user-centrically developed, which may further increase user convenience of mobile devices. As a result, users may execute various operations of mobile devices by one or two input actions using an intuitive graphic user interface (GUI).

A mobile device may be an electronic device to which mobility or a user's portability may be considered. Weight of a mobile device may be decreased due to lightness and sizes of various electronic parts integrated therein. Since portability may be a consideration in designing the mobile devices, there may be a limit to increasing the size of a mobile device. Therefore, a mobile device may be constrained to allocate a space for a user interface, such as a display or a keypad. In particular, there may be an inherent limitation in that a screen size of a touch screen, which may be used as an input/output interface in various mobile devices, cannot exceed the size of the mobile device.

Due to some advancement in capability of increasing storage capacity, the mobile device may store and process a large amount of data. Stored data may generally be arranged in a vertical or a horizontal direction or in the form of a matrix type list, and be displayed on a display. However, due to the limitation in the size of the display, there may be a limit to the amount of data that can be displayed on the display at once.

One method for managing a large amount of data using a small-sized display may suggest selecting data or dividing data into a plurality of groups in accordance with a reference standard. This method may arrange and classify data in a form of a hierarchical tree. Since the hierarchically arranged data may be listed on a group or subgroup basis and displayed on a screen display, the size of an individual data list may also be reduced.

As for an existing method for classifying a large amount of data in a group or a subgroup basis, a user may individually select each item displayed on a list, and the group or the subgroup to which the corresponding items may belong is displayed one by one. More specifically, first, if a list of data is displayed on a display, a user may select a single item to be selected or classified from the list displayed on the display. Then, a list of candidate groups or candidate subgroups to which the selected item may belong to may be displayed again. If the user selects one of the candidate lists displayed, the classification of the selected item may be achieved. Alternatively, the selected item may be shifted to a list different from the existing list and then displayed. In this manner, the classification of the selected item may be achieved.

However, it may be cumbersome for the user to select items from the list each time the user may choose to classify one or more items. In particular, in the case of the former, a category to which the corresponding item may belong to also may be selected to the inconvenience of the user. Further, if the amount of data to be classified is large, the user may review the entire amount of data and also individually select each item determined as suitable for conditions. Therefore, considerable time and effort may be used to classify or select data.

SUMMARY

Exemplary embodiments of the present invention provide a mobile device and a method for classifying a large amount of data with a reduced number of actions.

Additional features of the invention will be set forth in the description which follows, and in part will be apparent from the description, or may be learned by practice of the invention.

Exemplary embodiments of the present invention provide a method for displaying lists on a mobile device including displaying a first list including multiple items; setting a selection condition for at least one of the items of the first list; determining whether the at least one of the items of the first list is a selection data corresponding to the selection condition; scrolling the first list in response to an input received by the mobile device; detecting whether the at least one of the items of the first list is located in a shift region; and shifting the at least one of the items of the first list located in the shift region to a second list if the at least one of the items of the first list located in the shift region is determined to be the selection data, in which the first list and the second list are displayed on the mobile device.

Exemplary embodiments of the present invention provide a mobile device including a memory to store multiple items of a first list; a touch screen to display the first list including the multiple items, to display a second list including at least one of a selection data, and to receive an input to scroll the first list; and a control unit to set a selection condition of at least one of the items of the first list, to determine whether at least one of the items of the first list is a selection data corresponding to the selection condition, to detect whether the at least one of the items of the first list is located in a shift region, and to shift the at least one of the items of the first list located in the shift region to a second list if at least one of the items of the first list located in the shift region is determined to be the selection data.

Exemplary embodiments of the present invention provide a method for displaying a first list and a second list on a mobile device including displaying a first list including a first item and a second list including a second item; scrolling the first list in a first direction; detecting whether the first item is located in a shift region; and shifting the first item located in the shift region to the second list for displaying both the first item and the second item in the second list if the first item corresponds to the selection condition, in which the first item shifted to the second list is shifted back to the first list if the first item of the second list is scrolled to the shift region in a second direction.

It is to be understood that both the foregoing general description and the following detailed description are exemplary and explanatory and are intended to provide further explanation of the invention as claimed. Other features and aspects will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
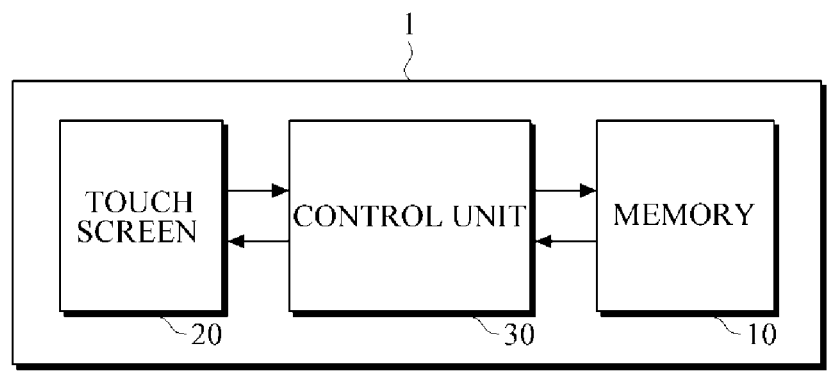
FIG. 1 is a block diagram showing a configuration of a mobile device according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of X, Y, and Z" can be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

FIG. 1 is a block diagram showing a configuration of a mobile device according to an exemplary embodiment of the present invention.

Referring to FIG. 1, a mobile device 1 includes a memory 10, a touch screen 20, and a control unit 30. The configuration of the mobile device 1 shown in FIG. 1 illustrates a configuration of a mobile device according to describe an exemplary embodiment of the present invention and is not limited thereto. Additional components to perform other operations of the mobile device 1 may be further included in the mobile device 1. Further, the additional components may vary based on a type or an operation of the mobile device 1. For example, the mobile device 1 may include, without limitation, a cellular phone, an MP3 player, a digital camera, a portable multimedia player (PMP), a navigation device, a portable game player, an electronic dictionary, an e-book reader, a digital multimedia broadcasting (DMB) receiver, a smart phone, or a tablet computer.

The memory 10 may store data in the mobile device 1. The memory 10 may store an operating system (OS) program used in an operation of the mobile device 1, internal application programs, and downloaded application programs, which may be downloaded by a user. The memory 10 may store at least one of e-mails, texts, images, videos, documents, music, phone numbers, phone call records, messages, and applications in respective databases. Stored data of the same type (e.g., tens of video files, hundreds of music files, phone numbers, or image files) may be stored in each compartment of the memory 10.

The touch screen 20 may include an input/output unit to support an interaction between a user and the mobile device 1. The user may input a command or information to the mobile device 1 by touching the touch screen 20, with a user's body part (e.g., a finger) or through a stylus pen or a similar device. The mobile device 1 may output information or data to the user through the touch screen 20. The touch screen 20 may have a combined structure or an integrated structure of a touch pad serving as an input unit, and a display serving as an output unit.

In addition to the touch screen 20, a camera and/or a sensor may be used to receive an input. For example, a camera (not shown) and a proximity sensor (not shown) equipped in the mobile device 1 may be used to recognize an action of the user, thereby detecting an input to the mobile device 1. A gravity sensor and/or an acceleration sensor equipped in the mobile device 1 may be used to recognize a motion of the mobile device 1, thereby detecting an input to the mobile device 1. Although the following disclosure will be described with the use of the touch screen 20 as the input unit, the use of other types of input units (e.g., cameras and/or various sensors) in conjunction with or in addition to the touch screen 20 may also be included.

Data stored in the memory 10, specifically in each portion or compartment of the memory 10 may be displayed as an original list on the touch screen 200. Together with the original list, data satisfying reference conditions may be displayed as a select list on the touch screen 20. In an example, a list may refer to a data set that may include a plurality of data that is arranged vertically, horizontally, or in a matrix form on the touch screen 20. Each item in the list may be referred to as an item. Accordingly, a list may refer to a set of items that may be arranged vertically, horizontally, or in a matrix form on the touch screen 20.

The control unit 30 may perform an overall management and control operation of the mobile device. For example, the control unit 30 may perform control and signal processing of a communication between the mobile device 1 and a server or another mobile device, such as data communication or telephone call. The control unit 30 may perform control and signal processing for a reference operation in the mobile device 1, such as execution of a game or multimedia application. The control unit 30 may input data to the memory 10, correct data in the memory 10, and delete data from the memory 10. The control unit 30 may query the memory 10 to fetch data stored in the memory 10.

The control unit 30 may perform a reference process according to an input received through the touch screen 20, and may control to output reference data through the touch screen 20. More specifically, according to the received input, the control unit 30 may display data stored in the memory 10 on the touch screen 20 in a form of a list (hereinafter referred to as 'original list'). For example, if the user selects a menu item, which may include at least one of a phone book menu, a mail menu, a music play menu, a video play menu, and an image display menu, the control unit 30 may display at least one of a phone book, received mail, a music file, a video file, or an image file, which may be stored in the memory 10, on the touch screen 20 in the form of an original list. As described above, an input from the user may be received through the touch screen 20, however, is not limited thereto. For example, input from the user may also be received, without limitation, through a camera, a proximity sensor, a gravity sensor, or an acceleration sensor.

If detecting a user's input to the original list displayed on the touch screen 20, the control unit 30 may perform a reference process corresponding to the input. In an example, the input to the original list may include at least one of a user's input received or detected through a physical touch to the original list, and a user's input received or detected through an indirect unit (e.g., a scroll bar or arrow keys). The input operation to the original list may include at least one of performing a motion on the original list so that the motion can be detected by a sensor, and applying a motion to the mobile device 1 so that the motion can be detected. In an example, the motion on the original list may be detected by a camera, a proximity sensor, and the like. Also, the motion to the mobile device 1 may be detected by a gravity sensor, acceleration sensor, and the like.

The reference process may vary based on the type of input. For example, if the user clicks an item (e.g., a video file) in the original list (or a select list described below) displayed on the touch screen 20, the control unit 30 may execute a corresponding application (e.g., a multimedia player). If the user applies a directional touch (e.g., a unidirectional touch and drag operation or a unidirectional flick operation) to the original list displayed on the touch screen 20, the control unit 30 may scroll the items of the original list displayed on the touch screen 20 in the direction of the touch.

The control unit 30 may determine whether one or more items in the original list displayed on the touch screen 20 corresponds with a reference selection condition. Herein, the selection condition may be set by the user. The control unit 30 may indicate the determination result for each item. More specifically, the control unit 30 may determine whether each item corresponds with the selection condition (e.g., highlighting the target item to discriminate it from another item, or indicating the target item with a mark).

Among the items of the original list, the control unit 30 may shift the item corresponding with the selection condition to a select list separated from the original list, and display the shifted item on the touch screen 20. On the touch screen 20, the original list and the select list may be displayed simultaneously, but separately. For example, the select list may be displayed above the original list (i.e., on the top portion of the touch screen 20), below the original list (i.e., on the bottom portion of the touch screen 20), or in other methods that may distinguish the original list from the select list. The size of the original list may be reduced by the size of the select list.

The control unit 30 may display the select list on the touch screen 20 if at least one item is present in the select list. Alternatively, the control unit 30 may display the select list (i.e., an empty region to display items) on the touch screen 20 even if no item may present in the select list. Further, the control unit 30 may display the select list on the touch screen 20 if a specific condition is satisfied. For example, the control unit 30 may activate the select list and display the select list and the original list on the touch screen 20 if the original list is being scrolled, but may deactivate the select list and display the original list on the touch screen 20 but not the select list if the original is not being scrolled. In this case, the original list may be displayed on the touch screen 20 in a size greater than a reference size while displaying both the original list and the select list on the touch screen 20 simultaneously, if the user examines the item included in the original list in detail.

The control unit 30 may display the select list on the touch screen 20 while reducing the size of the select list according to the number of items included in the select list. For example, the size of the select list may increase in proportion to the number of items included in the select list. However, there may be a limit on the maximum size of the select list. The placement of the limit may reduce the likelihood of the size of the original list from continuing to decrease with an increase in the size of the select list so that it becomes difficult to read, thereby maintaining the original list to be larger than a reference size. For example, the size of the select list may not increase any more if the number of items in the select list exceeds a reference number while the size of the select list increases in proportion to the number of items in the select list. If a number of items included in the select list above a reference threshold, such that the select list cannot be displayed in a reference size, the control unit 30 may reduce the size of one or more items to include some or all of the items in the select list to display on the touch screen 20, or may display a scrollable select list on the touch screen while maintaining the size of the items of the select list to be larger than a reference size.

The control unit 30 may display both the original list and the select list on the touch screen 20 simultaneously in such a way that the items that may be scrolled and deviated from the boundary of the original list may be located under the select list. For example, the control unit 30 may transparently or semitransparently display the select list on the original list on the touch screen 20 in such a way that the items scrolled, shifted to the select list and deviated from the original list may be located under the select list.

Among the items included in the original list and displayed on the touch screen 20, the control unit 30 may shift one or more items corresponding with the selection condition to the select list. In an example, if an item corresponding with the selection condition satisfies a certain condition, the control unit 30 may shift the item to the select list, which may be displayed on the touch screen 20. For example, if the items of the original list are scrolled in one direction and the items of the original list corresponding with the selection condition (including the first item corresponding with the selection condition and the item following the first item) reaches a reference location (hereinafter referred to as 'shift region'), the control unit 30 may shift the relevant items to the select list. In this case, the shift region may refer to one region of the touch screen 20 where the first item in the scroll direction of the items may be located among the regions where the items of the original list are located, but is not limited thereto. The location of the shift region may also vary as the size of the original list varies according to a variation in the size of the select list.

The control unit 30 may shift an item of the selection list to be displayed on the touch screen 20 according to an input provided by a user or in response to a reference condition being satisfied. For example, the control unit 30 may scroll the items of the original list, including a first item satisfying a reference condition, in a first direction according to a user's touch input and may shift the first item to the select list if the first item reaches the shift region. Thereafter, if a directional touch input is provided in a second direction, which may be different or opposite to the first direction, is received from the user, the control unit 30 may scroll the items of the original list in the second direction. Further, if the first item in the select list reaches the shift region (i.e., if the item previous to the first item passes through the shift region in the second direction), the control unit 30 may return the first item to the original list to be displayed on the touch screen 20. Further, the first item may be returned to an original position in the original list. Even if the original list may be scrolled in the second direction according to the setting from the user (e.g., if the user pre-inputs a fixation signal to fix the first item to the select list), the control unit 30 may leave the first item in the select list without returning the first item to the original list.

In this manner, the mobile device may determine whether the items of the original list displayed on the touch screen correspond with the reference selection condition. The items corresponding with the selection condition may be automatically shifted to the selection list to be displayed on the touch screen. Further, the items of the original list may be scrolled in one direction corresponding to the input direction, and the item corresponding with the selection condition may be shifted to the select list if reaching the shift region. If the number of items shifted to the select list increases, the size of the select list or items in the select list may increase. The size of the select list may not increase any more if the size of the select list becomes larger than a reference size. The size of one or more items in the select list may be reduced, or the items may be displayed to be scrollable in the select list. If data is scrolled in the direction different or opposite to the scroll direction of the original list, the item in the select list may be shifted to the original position in the original list.

Figure 2:
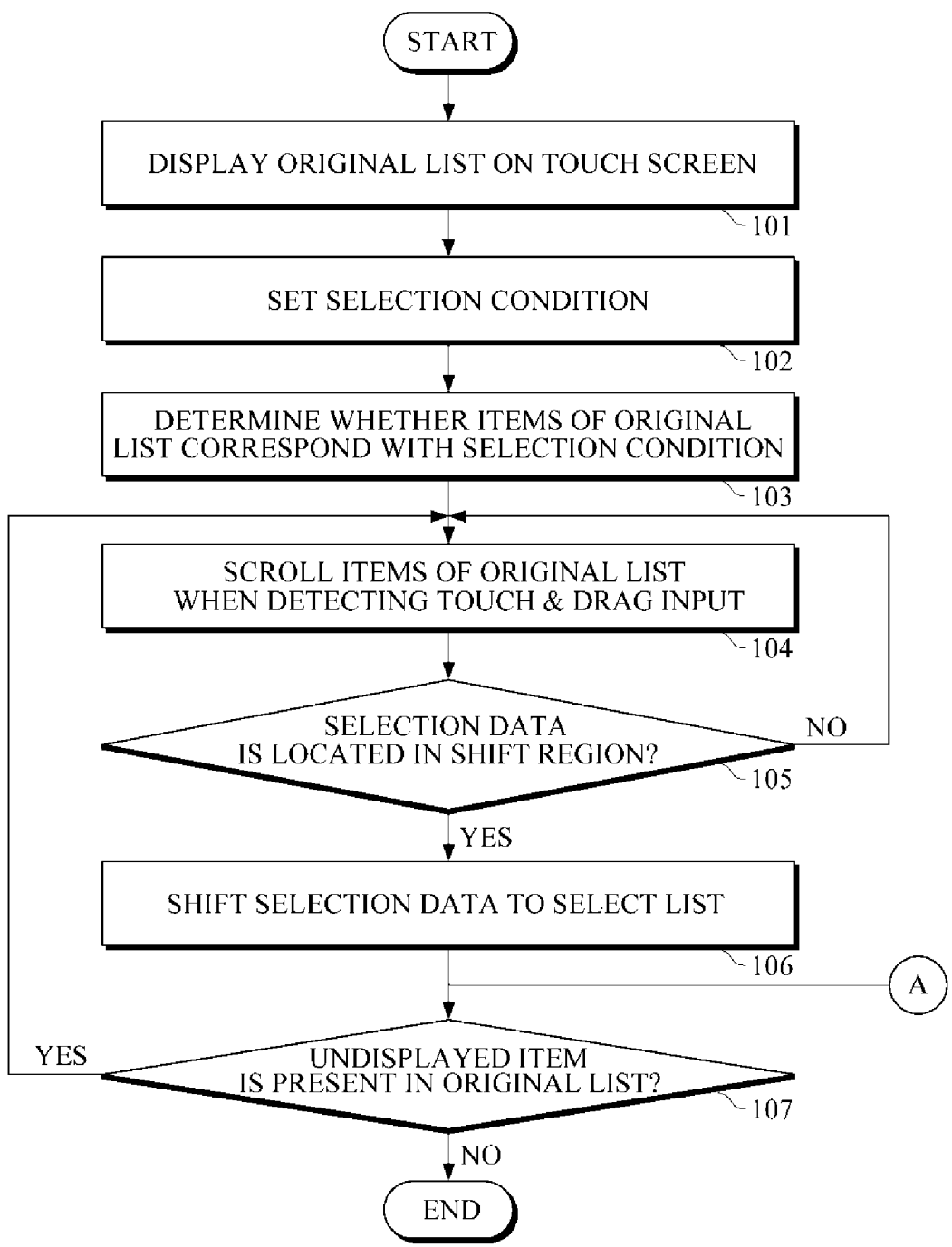
FIG. 2 is a flow chart showing a method for controlling an operation of a mobile device according to an exemplary embodiment of the present invention.

FIG. 2 is a flow chart showing a method for controlling an operation of the mobile device according to an exemplary embodiment of the present invention.

Referring to FIG. 2, the mobile device displays the original list including a plurality of items on the touch screen (101). The item included in the original list may be data stored in each compartment or database (DB) of a memory of the mobile device. The item included in the original list may be data stored in compartments or DBs designated to store categories of information, which may include, without limitation, an incoming mail, an outgoing mail, a picture file, a video file, a document file, a music file, a phone book, an outgoing call record, an incoming call record, an incoming message, an outgoing message, or an installed application.

The original list to be displayed on the touch screen of the mobile device may accommodate various types of inputs and commands. For example, if the user accesses a folder where relevant data or files may be stored, the original list may be displayed on the touch screen. In an example, the original list may be displayed on the touch screen if the user executes an application or a menu where the original list may be displayed, such as a phone book menu, an incoming/outgoing mail box menu, a music play application, a video play application, or an image display application.

Figure 4A:
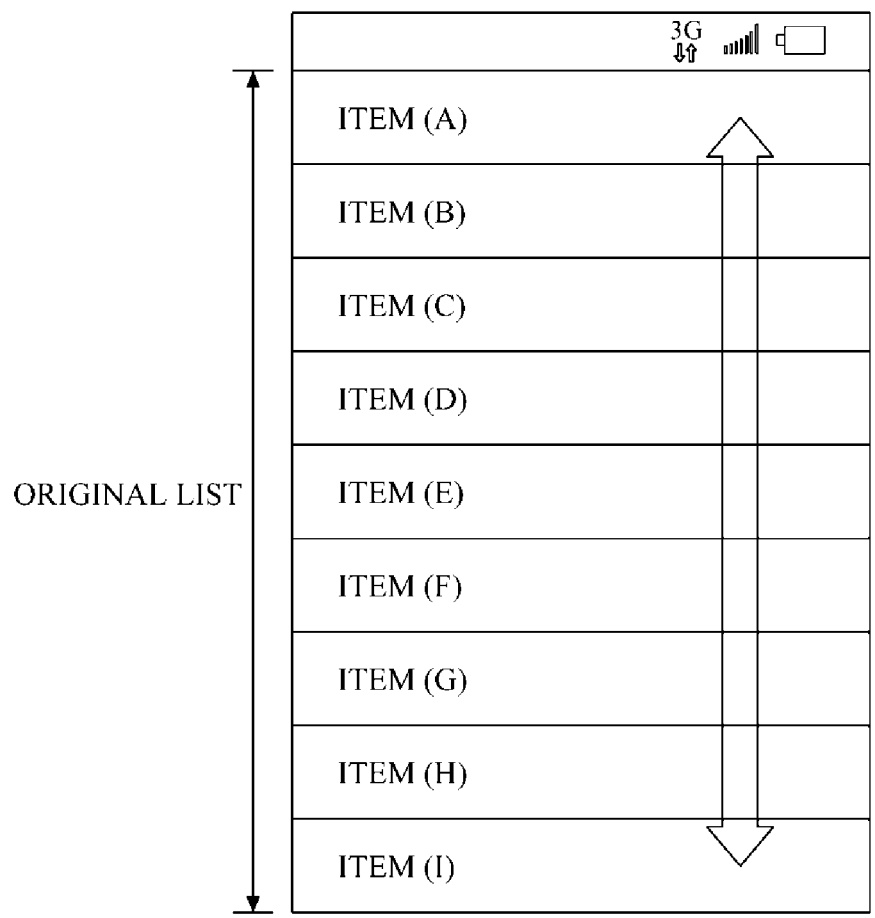
FIG. 4A is a diagram showing an original list displayed on a touch screen corresponding to step 101 of FIG. 2 according to an exemplary embodiment of the present invention.

FIG. 4A shows an example of the original list displayed on the touch screen according to step 101 of FIG. 2 according to an exemplary embodiment of the present invention.

Referring to FIG. 4A, a portion of the original list is initially displayed on the touch screen. Herein, the original list may be displayed such that the original list occupies at least a portion of the touch screen. FIG. 4A shows nine items (items A to I) with a reference size in the original list. For example, the number of items in the original list displayed on the touch screen, or the size of one or more items in the original list may vary based on a number of factors, which may include, without limitation, the contents of items, the user's recognizability, and/or the user's settings. In FIG. 4A, a vertical arrow shown in the original list may indicate that the original list can be scrolled up or down. In an example, if the start portion or the last portion of the original list is displayed on the touch screen, the original list may not be scrolled in one direction. More specifically, more than nine items may be included in the original list, even though FIG. 4A shows that only nine items may be simultaneously displayed in consideration of the size of the touch screen, the user's recognizability, and so on. The user may perform a flick operation or a touch and drag operation on the original list using the touch screen in one direction so that currently-undisplayed items may be displayed on the touch screen. In an example, the flick operation and/or the touch and drag operation may be performed by a direct touch to the touch screen or by an indirect touch through a camera, a stylus, or a sensor as described above. Further, various methods may be available for determining the size of each item or the number of items that can be simultaneously displayed on the touch screen.

Referring back to FIG. 2, the user sets a selection condition for selecting data of the original list (102). The selection condition setting operation may be performed while the mobile device interacts with the user through the touch screen, but is not limited thereto. For example, a screen to input the selection condition may be displayed on the touch screen, and the user may input a certain selection condition thereto or may select one of reference selection condition candidates. FIG. 2 illustrates that the selection condition setting operation (102) is performed after the original list displaying operation (101), but the order of operation is not limited thereto and is merely exemplary in nature. For example, the selection condition setting operation (102) may be performed before the original list displaying operation (101), or may be performed separately from the original list displaying operation (101).

The selection condition relates to the attribute of data displayed in the form of the original list. The selection condition may be information that can be detected by the control unit 130 of FIG. 1 through the detailed information of each data or metadata of each file. This may allow the control unit 130 to automatically detect data (item) to be selected, without the user's intervention. The detailed selection condition may vary based on the type or attributes of data to be classified. For example, in the case of an incoming mail, the selection condition may relate to a name or group of a sender, or a receipt date. In the case of a phone book, the selection condition may relate to a relevant group or recent call history. In the case of a music file or a video file, the selection condition may relate to a genre of the relevant music or video, the attribute of the file, or the type of file. In the case of an application, the selection condition may relate to a category relevant to the application (e.g., game, health, exercise, education, finance, traffic, or weather).

Referring back to FIG. 2, the mobile device determines whether the items of the original list displayed on the touch screen correspond with the reference selection condition (103). Whether the items of the original list initially displayed on the touch screen correspond with the selection condition may be determined in advance or at the same time when the items are displayed. Whether the items of the original list displayed on the touch screen according to the display of the original list correspond with a reference selection condition may be determined in advance or at the same time if the items are displayed. As described above, the determination operation (103) may be automatically performed in the mobile device by using information or attributes of one or more items in the original list (i.e., the metadata or the detailed data of each item). The user may set the selection condition (see step 102).

The determination result may be displayed in the original list on the touch screen. The determination result may be displayed in various ways. The determination result may display the selected item and the unselected item to be discriminatively distinguished from each other. For example, the determination result may be displayed by highlighting the selected item or by displaying the selected item and the unselected item in different colors. Further, a mark or characters indicating that the item has been selected may be added to the selected item.

Figure 4B:
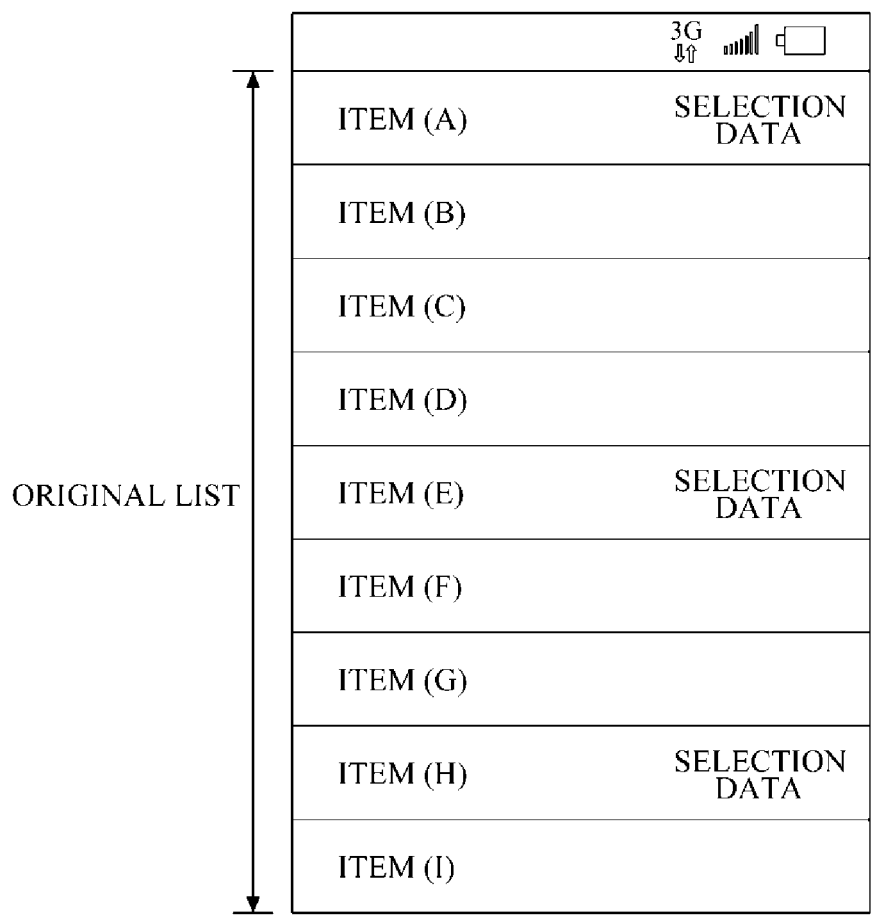
FIG. 4B is a diagram showing a touch screen on which the determination result in step 103 of FIG. 2 is displayed according to an exemplary embodiment of the present invention.

FIG. 4B is a diagram showing a touch screen on which the determination result in step 103 is displayed according to an exemplary embodiment of the present invention. Referring to FIG. 4B, the items corresponding to the selection condition are marked with the characters 'SELECT DATA'.

Referring back to FIG. 2, if a directional touch input with directionality (e.g., a unidirectional touch and drag input or a flick input) with respect to the original list is detected from the touch screen, the mobile device scrolls the items of the original list in the same direction as the touch input (104). For example, as shown in FIG. 4A, if a touch input with directionality is detected in the upward direction of the touch screen, the mobile device may scroll up the items of the original list. Consequently, the original list may be shifted upward. Thus, a portion of the upper items may be hidden or removed from display on the touch screen, and new items, which were not previously displayed, may appear at the lower portion of the touch screen. The number of items hidden or removed may correspond to the number of new items that may be displayed.

Figure 4C:
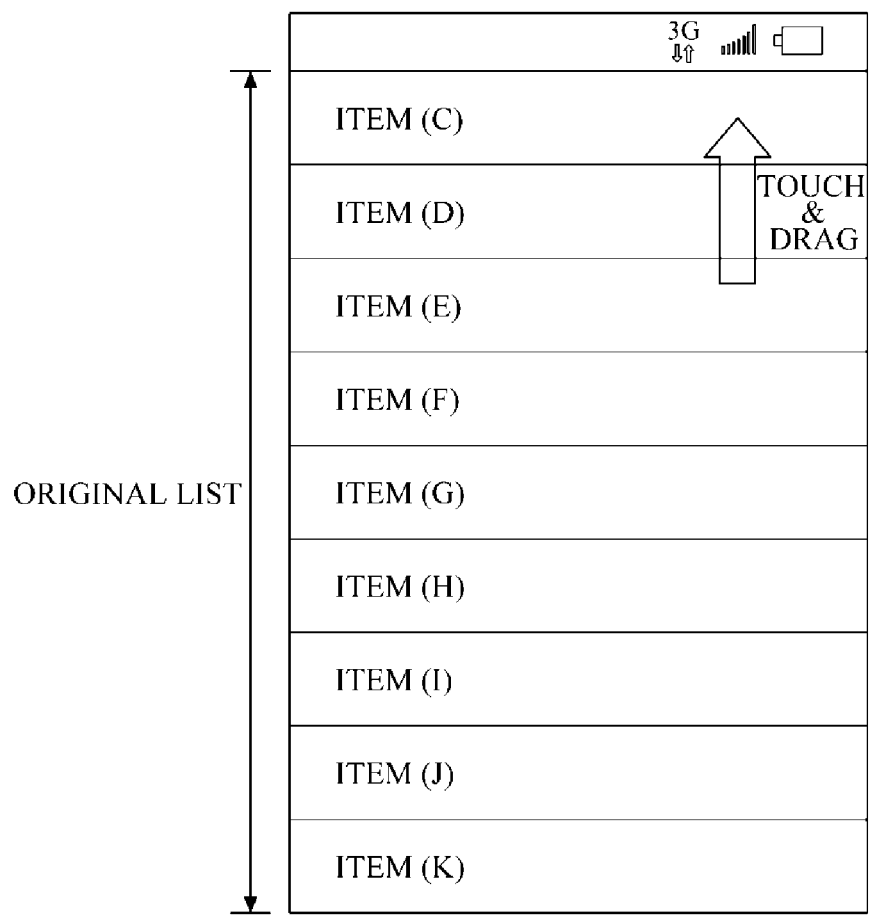
FIG. 4C is a diagram showing a display state of a touch screen of FIG. 4A on which a directional touch is detected according to an exemplary embodiment of the present invention.

FIG. 4C is a diagram showing a display state of the touch screen of FIG. 4A on which a directional touch is detected according to an exemplary embodiment of the present invention.

Referring to FIG. 4C, it can be seen that the original list is scrolled up, so that some items of the original list positioned at an upper portion of the touch screen (i.e., items A and B) may be hidden or removed from display of the touch screen, and new items (i.e., items J and K) appears at a lower portion of the touch screen. In an example, there may be various methods that may be implemented to display and manage how the items may be hidden or removed from the touch screen and how the new items may be added or shown on the touch screen.

Referring back to FIG. 2, the mobile device determines whether the item present in a shift region corresponding to one region of the touch screen is an item (i.e., selection data) corresponding with the selection condition set in step 102 (105). If the item present in the shift region is determined to be selection data, the selection data is shifted to the select list and displayed on the touch screen (106). Herein, the shift region may be a region where the items of the original list are displayed, and is a region of the touch screen where the selection data may be shifted to the select list of the touch screen. More specifically, not all of the selection data corresponding to an item corresponding with the selection condition may be shifted to the select list, but the selection data, which may be initially located at the shift region or reaches the shift region while being scrolled in one direction, may be shifted to the select list. If an item reaching the shift region is determined not to be selection data, the item may not shifted to the select list.

The shift region may be a random region on the touch screen. The position and/or the size of the shift region need not be fixed to the specific position on the touch screen and/or the size of a unit item, and the position and/or size may vary. For example, the shift region may be a region of the touch screen where the uppermost or lowermost item of the original list is located (i.e., the touch screen where the original list is displayed). Herein, as described below, if the size or position of the original list is changed due to the creation or change of the select list, the position of a region of the touch screen where the uppermost or lowermost item of the original list is located, that is, the position of the shift region may be changed.

Figure 4D:
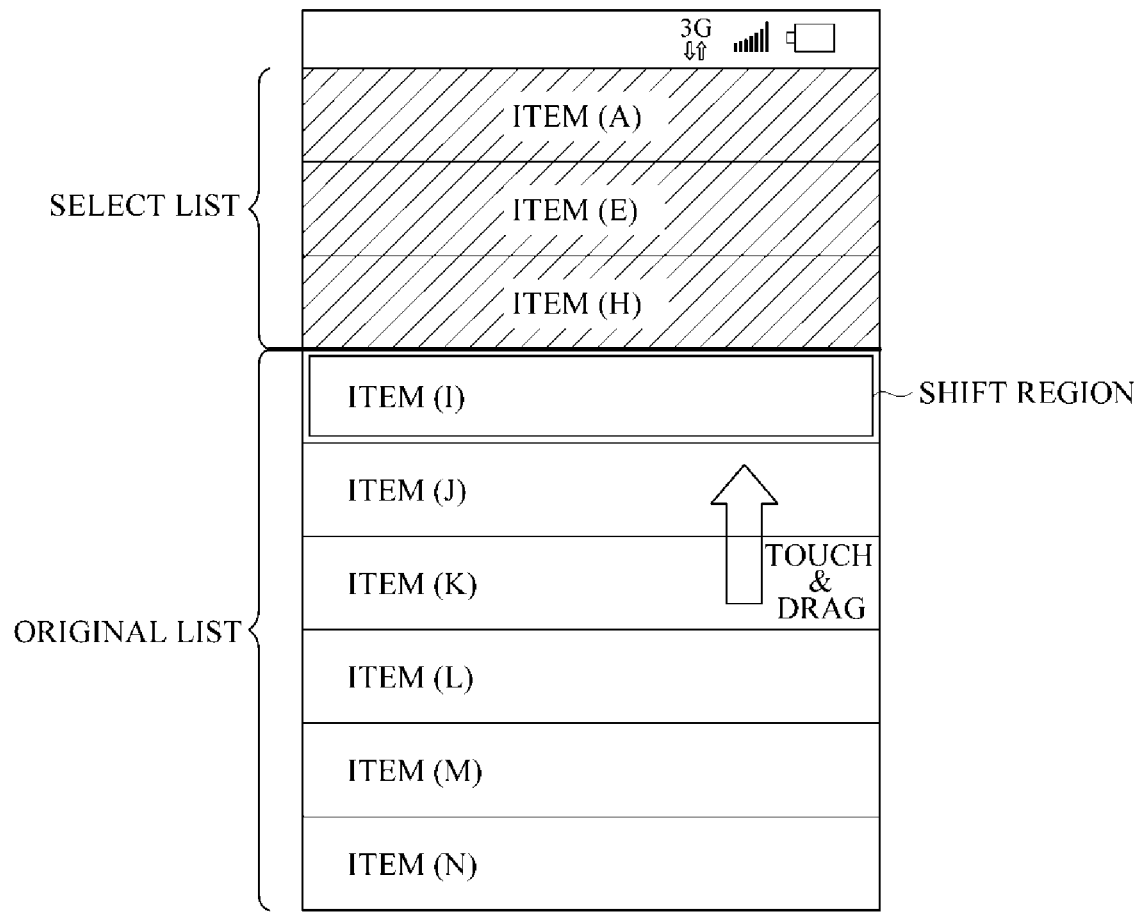
FIG. 4D is a diagram showing a state where a shift region is determined in conjunction with a scroll direction of an original list according to an exemplary embodiment of the present invention.

The shift region may also be determined in conjunction with the scroll direction of the items of the original list. FIG. 4D is a diagram showing a state where the shift region is determined in conjunction with a scroll direction of the original list according to an exemplary embodiment of the present invention. Referring to FIG. 4D, if the original list displayed on the touch screen is scrolled up by the user, the shift region may be a region of the touch region where the foremost item of the original list, but below a select list, in the scroll direction may be located, that is, a region of the touch screen where the uppermost item of the original list may be located. It will be apparent to those skilled in the art that the above principle may also be similarly applicable to the case where the select list is not yet created in the touch screen.

Accordingly, the selection data may be shifted to the select list if the selection data is hidden or removed from the original list by a scrolling motion or other similar motions. Further, the data selection operation may be related with an input action of the user itself.

The shift region may be the entire region of the touch screen where the original list may be displayed. In an example, whether each of the items corresponds with the selection condition may be determined at the time when the item is displayed on the touch screen, before the item is displayed on the touch screen, or after the item is displayed on the touch screen. Among the items displayed in the original list of the touch screen, some or all of the selection data corresponding with the selection condition may be shifted to the select list to be displayed on the touch screen. The shift region may include the entire region of the original list or a portion of the original list. The shift region may include a region of the touch screen, which satisfies a specific condition. For example, the entire region of the original list may be a shift region if the items of the original list are scrolled and then the last item of the original list is displayed on the touch screen.

Next, a detailed description will be given of the process where the items of the original list are scrolled in steps 104, 105 and 106. Thus, the selection data of the original list reaching the shift region may be shifted to the select list to be displayed on the touch screen.

If no selection data reaches the shift region, the select list may not be displayed on the touch screen and the entire original list may be displayed on the touch screen (see FIG. 4A). If the first selection data satisfying step 105 is created, the select list including at least one item (e.g., selection data) may be displayed on the touch screen.

Figure 4E:
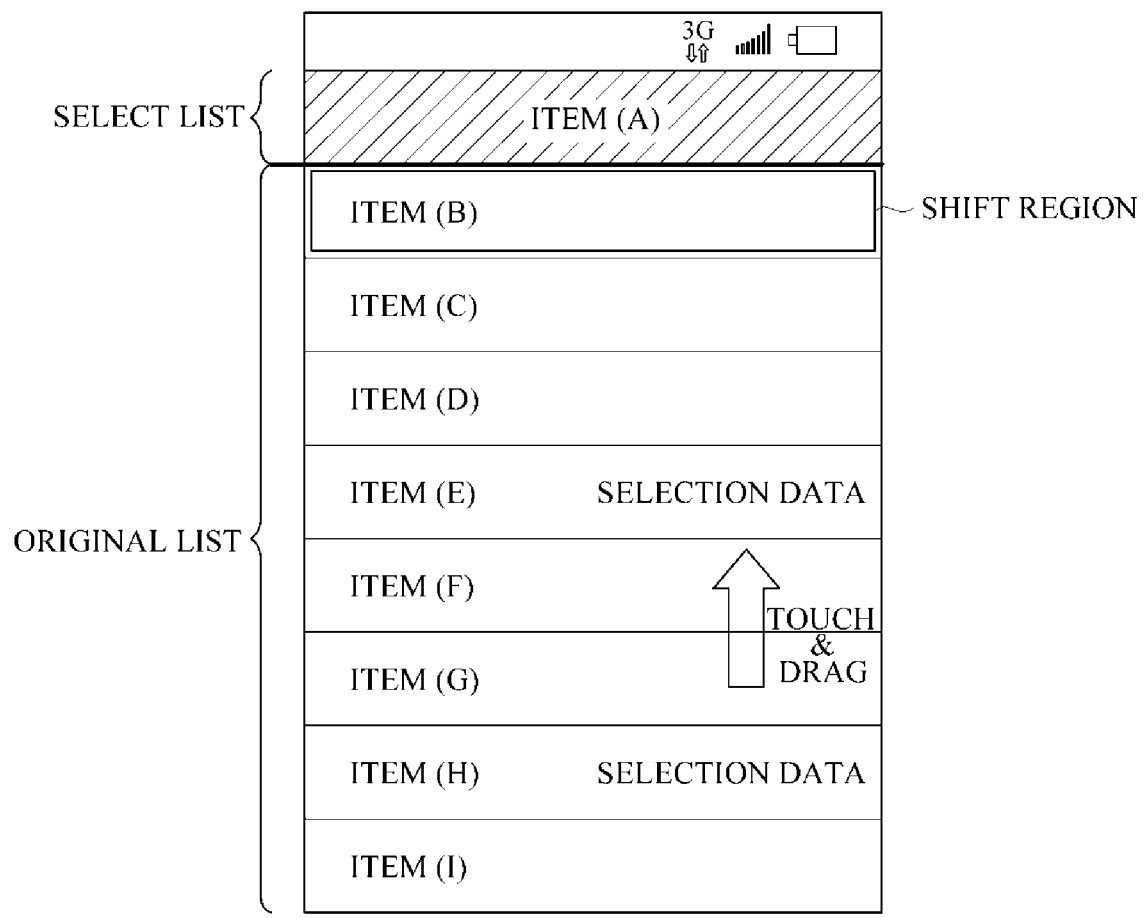
FIG. 4E is a diagram showing a display state of the touch screen on which a select list including a piece of selection data is displayed according to an exemplary embodiment of the present invention.

FIG. 4E is a diagram showing a display state of the touch screen on which the select list including a piece of selection data is displayed according to an exemplary embodiment of the present invention. Although not shown in FIG. 4E, the first shift region may be one region of the touch screen where the item A, that is, the selection data A may be located. FIG. 4E may show the state the selection data A is shifted and displayed on the touch screen. Since the original shift region may be displayed as an item of the select list, the shift region on the touch screen may be another region (e.g., a region of the original list where the foremost item in the scroll direction is located, that is, the region where the uppermost item of the original list is located in the case of FIG. 4E).

Referring to FIG. 4E, the select list is displayed on the original list discriminatively from the original list. There may be various methods of discriminating between the select list and the original list. For example, the select list and the original list may be discriminated from each other by displaying them in different colors or by displaying a boundary line therebetween. In FIG. 4E, the select list is displayed on the same touch screen as the original list, as an example but is not limited thereto. For example, the select list may be displayed under the original list or may be displayed on other region. Although the following description describes a case where the select list may be displayed on the original list and the scroll direction of the original list for data selection is the upward direction. It will be apparent to those skilled in the art that exemplary embodiments of the present invention may also be applicable to other cases (i.e., other positions and/or scroll directions of the select list).

Figure 4F:
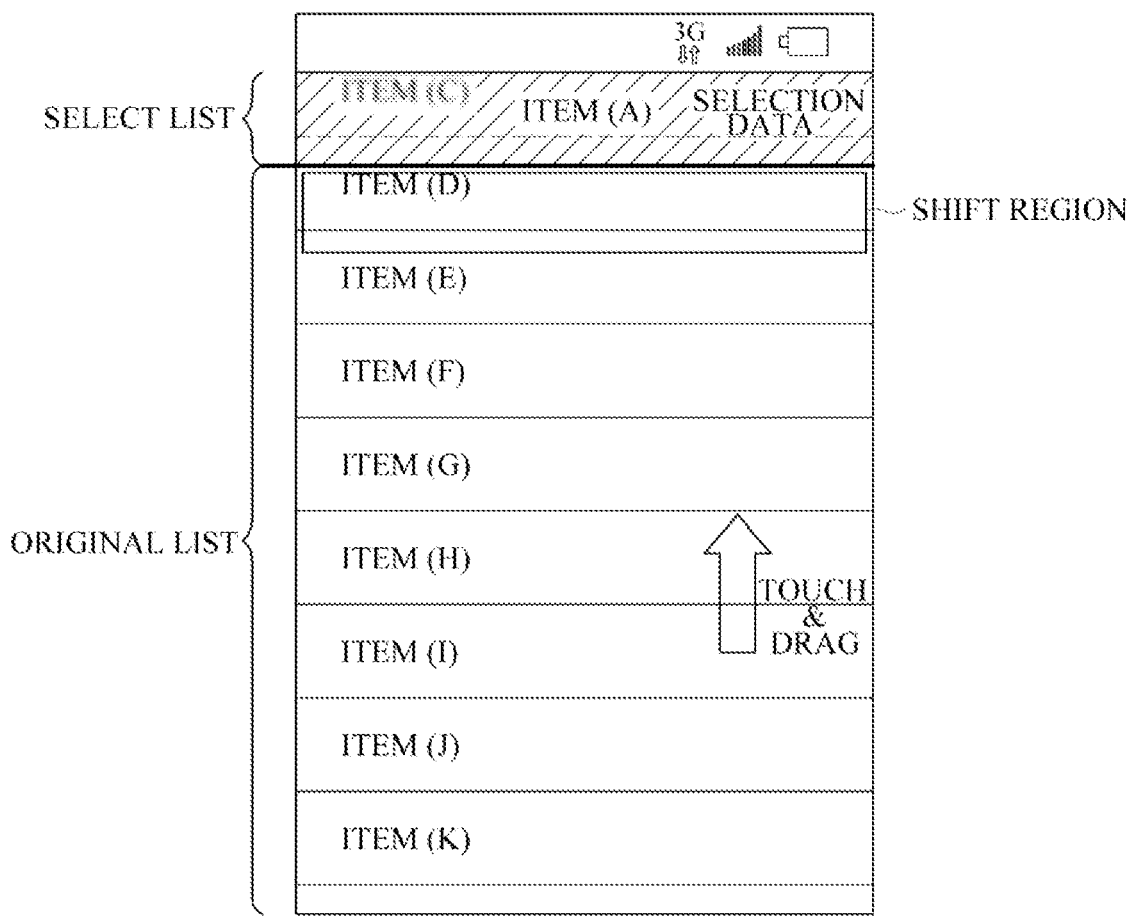
FIG. 4F is a diagram showing a display state of the touch screen when the original list is scrolled up in FIG. 4E according to an exemplary embodiment of the present invention.

If an upward touch and drag input is applied to the original list, the items of the original list may be scrolled up. FIG. 4F is a diagram showing a display state of the touch screen when the items of the original list in FIG. 4E are scrolled up according to an exemplary embodiment of the present invention. Referring to FIG. 4F, a portion of the item D is located under the select list (item A), which may be displayed semitransparently, and the remaining portion of the item D is displayed as being present in the original list. Since the items of the original list are scrolled upwards according to an upward input, item B and item C of the original list, which may not be selection data, may be hidden or removed from the original list. Further, item D, which may not be the selection data, may also be hidden or removed through the upper boundary of the original list (i.e., the boundary between the original list and the select list). FIG. 4F shows that the select list is semitransparent, but is not limited thereto. For example, the select list may be, without limitation, opaque or transparent as described below.

As the number of selection data located in the shift region increases, the number of items included in the select list may also increases. Accordingly, the area of the touch screen occupied by the select list may also increase.

Figure 4G:
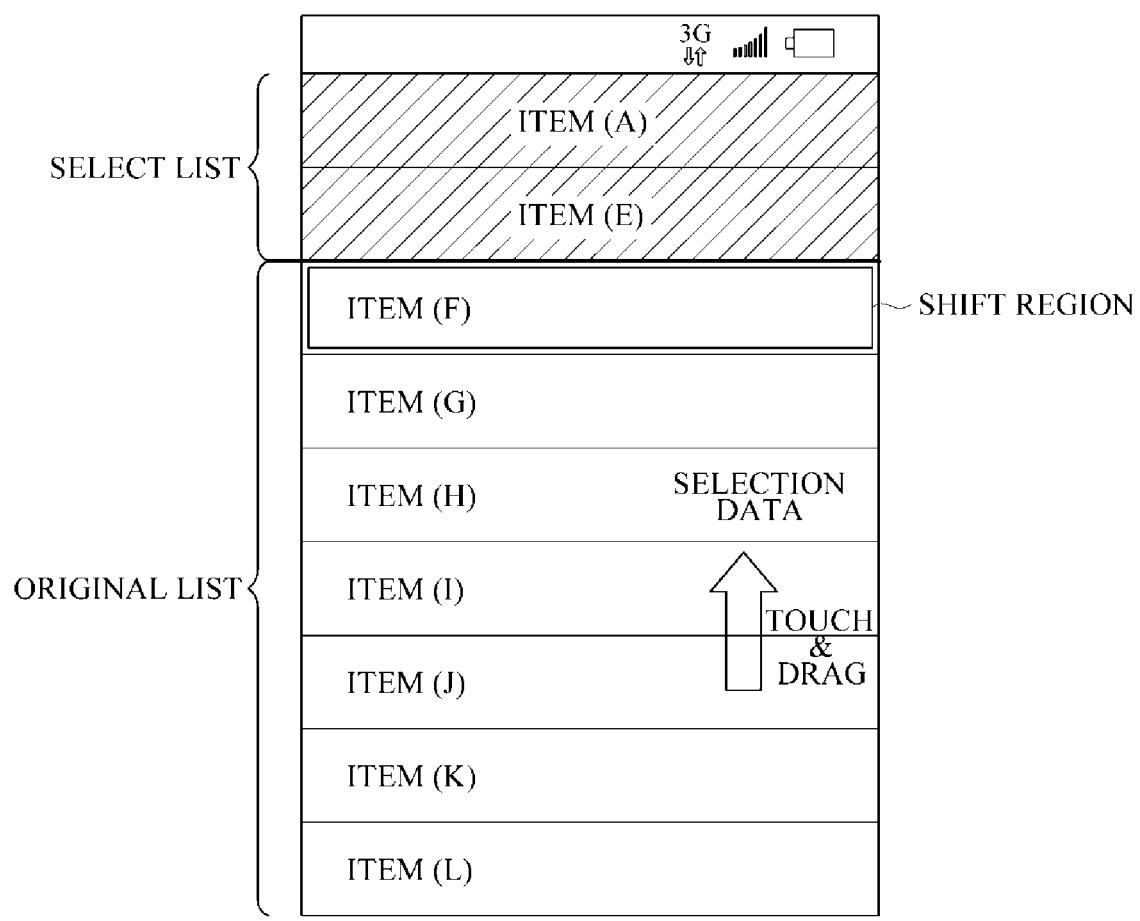
FIG. 4G is a diagram showing a display state of the touch screen on which an item E corresponding to selection data is shifted to the select list in FIG. 4E according to an exemplary embodiment of the present invention.
Figure 4H:
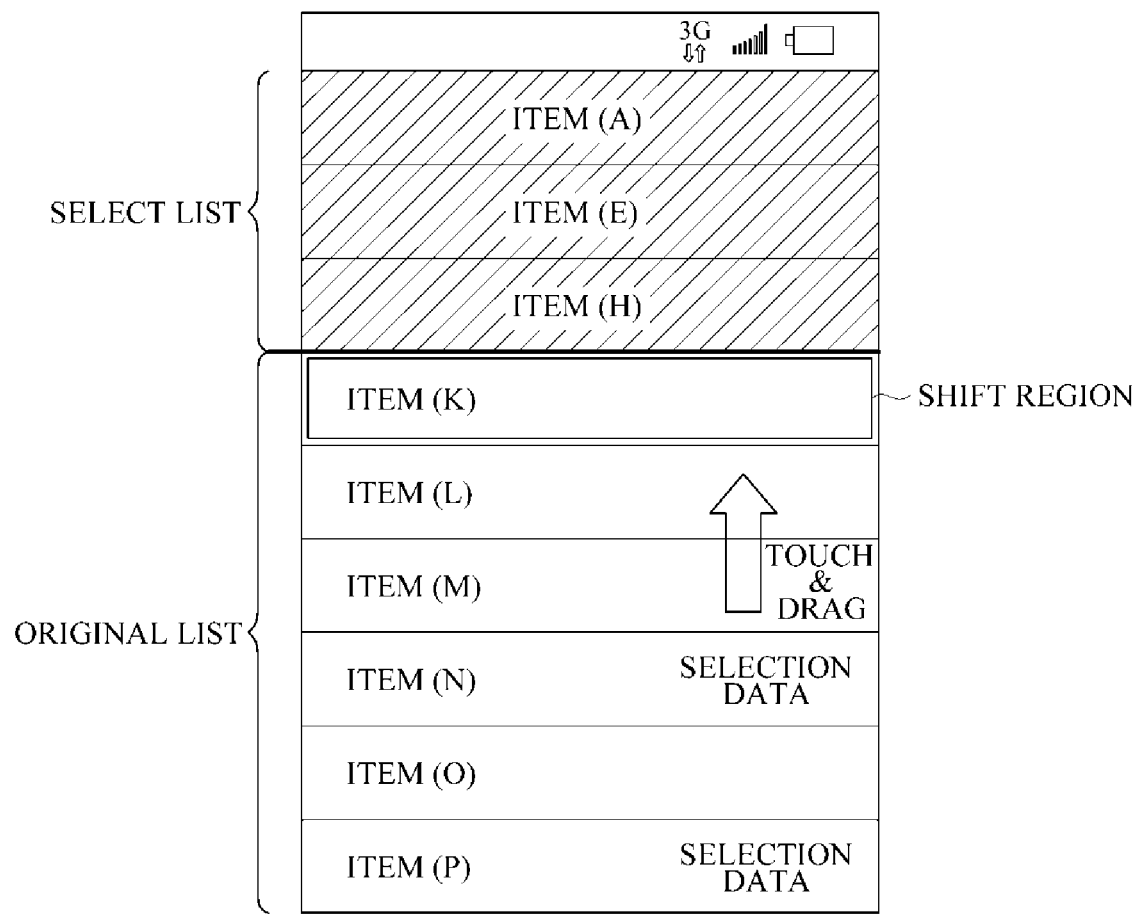
FIG. 4H is a diagram showing a display state of the touch screen on which an item H corresponding to selection data is shifted to the select list in FIG. 4G.

FIG. 4G is a diagram showing a display state of the touch screen on which selection data E is shifted to the select list in FIG. 4E according to an exemplary embodiment of the present invention. FIG. 4H is a diagram showing a display state of the touch screen on which selection data H is shifted to the select list in FIG. 4G according to an exemplary embodiment of the present invention.

Referring to FIG. 4G, the size of the select list increases as compared to the case of FIG. 4E. FIG. 4F may illustrate a subsequent operation after execution of an operation of FIG. 4E, but before a result illustrated in FIG. 4G. Referring to FIG. 4H, the size of the select list is increased as compared to the case of FIG. 4G. Although not shown in the drawings, the items of the process where the original list is scrolled up and a portion of the items of the original list disappears upward may be added between FIG. 4G and FIG. 4H. In FIG. 4G and FIG. 4H, since the size of the original shift region is displayed as an item of the select list, which may be increased in size, the shift region of the touch screen may be changed into another region of the original list.

However, there may be a limit that may be placed on an increase in the size of the select list. Accordingly, the upper size limit of the select list displayed on the touch screen may be determined in advance. For example, the size of the select list as shown in FIG. 4H may be the upper size limit, which may be located at a region of the touch screen, but the size limit is not limited thereto. In an example, if the item satisfying the condition of step 105 to add a number of selection data (e.g., four or more), the select list may be implemented in various ways so that all of the selection data can be displayed in the select list.

For example, the select list may be displayed on the touch screen so that the items of the select list may be scrolled while the items of the select list maintain the same size. In this case, the selection data displayed on the touch screen may be the item that previously reached the shift region, and the item shifted to the select list may disappear or hidden from the touch screen.

Figure 4I:
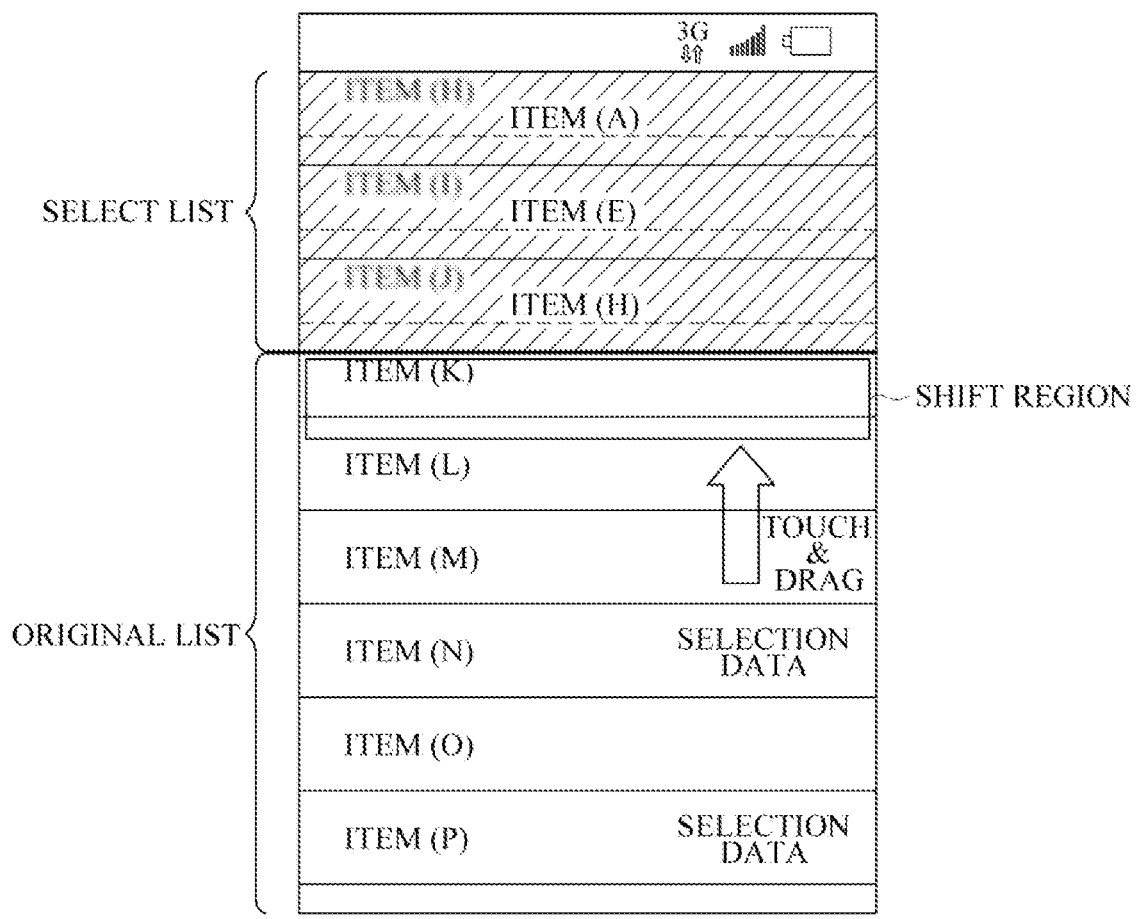
FIG. 4I is a diagram showing a display state of the touch screen on which an item N corresponding to selection data is being shifted to the select list in FIG. 4H according to an exemplary embodiment of the present invention.
Figure 4J:
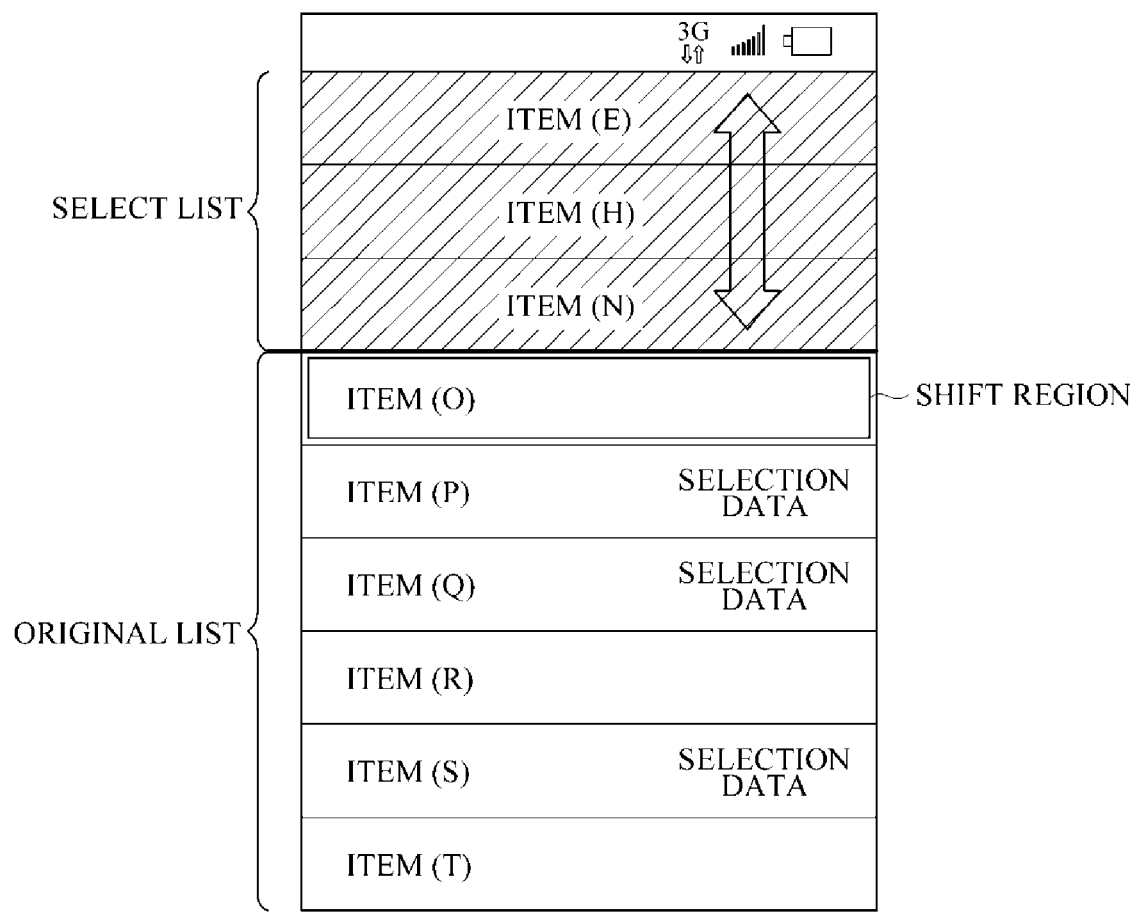
FIG. 4J is a diagram showing where scrollable items of the select list are displayed according to an exemplary embodiment of the present invention.

In FIG. 4H, the process where the items of the original list are scrolled up and item N, that is, the selection data is shifted to the select list as shown in FIG. 4J, may be displayed on the screen in various ways. FIG. 4I is a diagram showing a display state of the touch screen on which selection data is being shifted to the select list in the state of FIG. 4H (i.e., the state where the size of the select list is maximized) according to an exemplary embodiment of the present invention. FIG. 4J is a diagram showing a display state of the touch screen on which the selection data is shifted to the select list in the state of FIG. 4H according to an exemplary embodiment of the present invention.

Referring to FIG. 4I, if the items of the original list in FIG. 4H are scrolled up and item N reaches the shift region, item N corresponding to the selection data may be shifted to the select list in the direction of the item H (e.g., the scroll direction of the items of the original list). Accordingly, the foremost item (e.g., item A) in the select list may be hidden or disappear from the select list. According to this display method, it may appear that the selection data shifting process is associated with the scroll of the original list (i.e., the input action of the user). FIG. 4J shows an example of a display state where item N in FIG. 4I is shifted to the select list and the items of the select list are also scrollably displayed on the touch screen. In FIG. 4J, a double-headed arrow indicates that the items of the select list may be scrolled by a touch input having the same directionality as a touch and drag input.

Figure 4K:
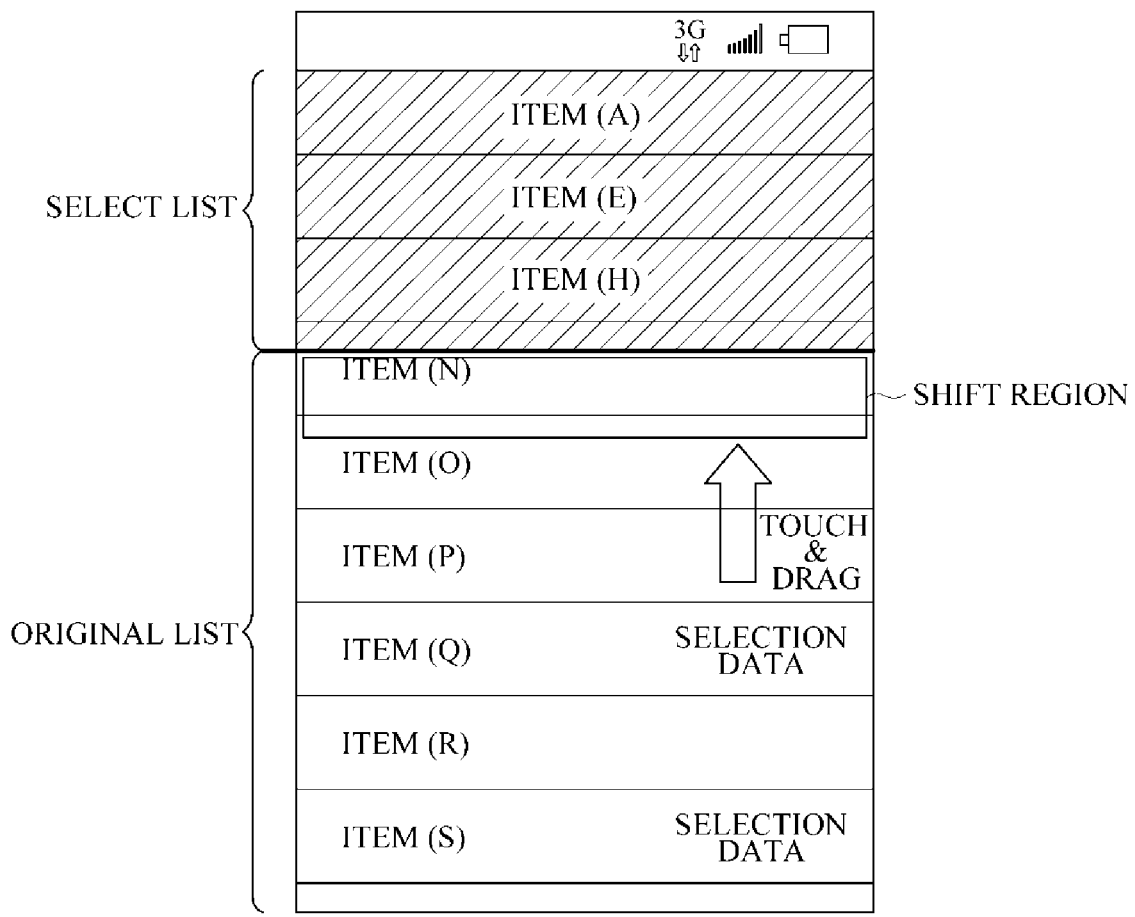
FIG. 4K is a diagram showing a display state of the touch screen on which an item N corresponding to selection data is being shifted to the select list in FIG. 4H according to an exemplary embodiment of the present invention.
Figure 4L:
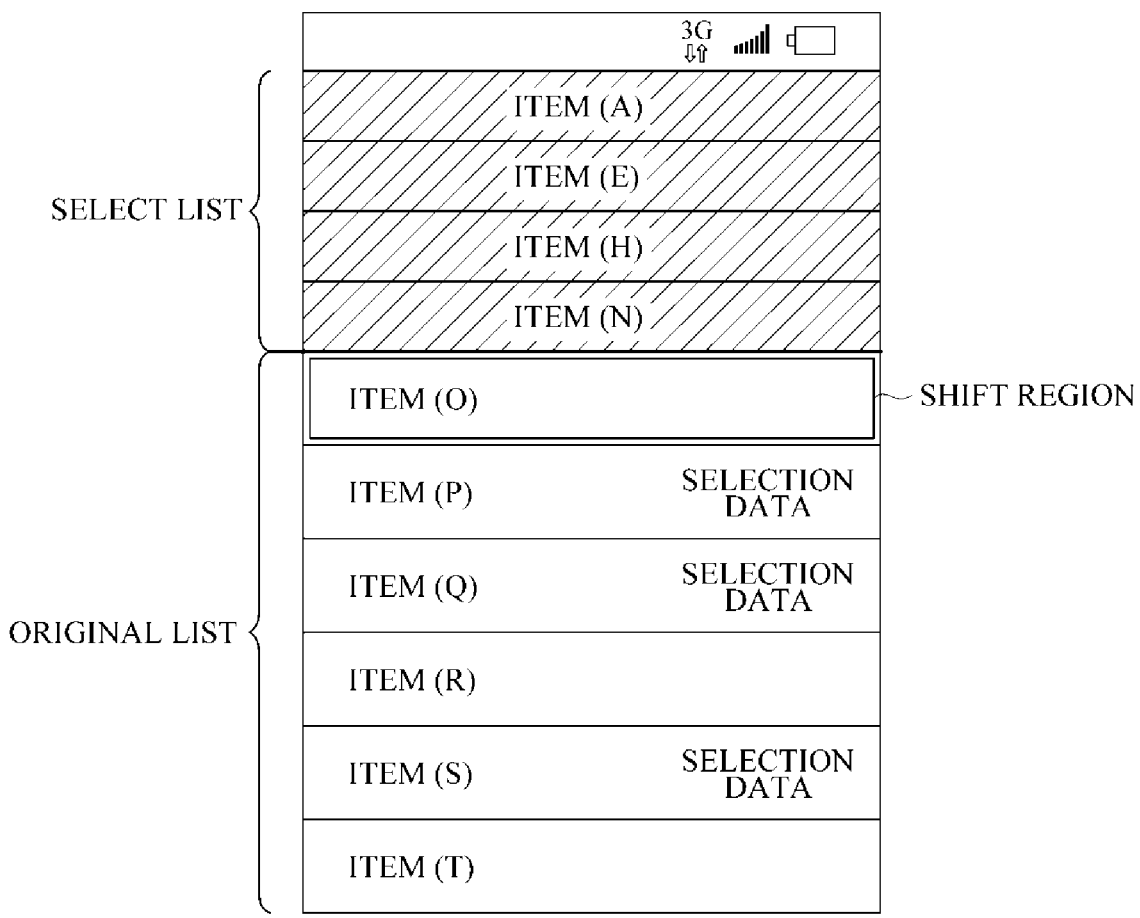
FIG. 4L is a diagram showing a large amount of selection data is included in the select list and relevant items are displayed in a reduced size according to an exemplary embodiment of the present invention.
Figure 4M:
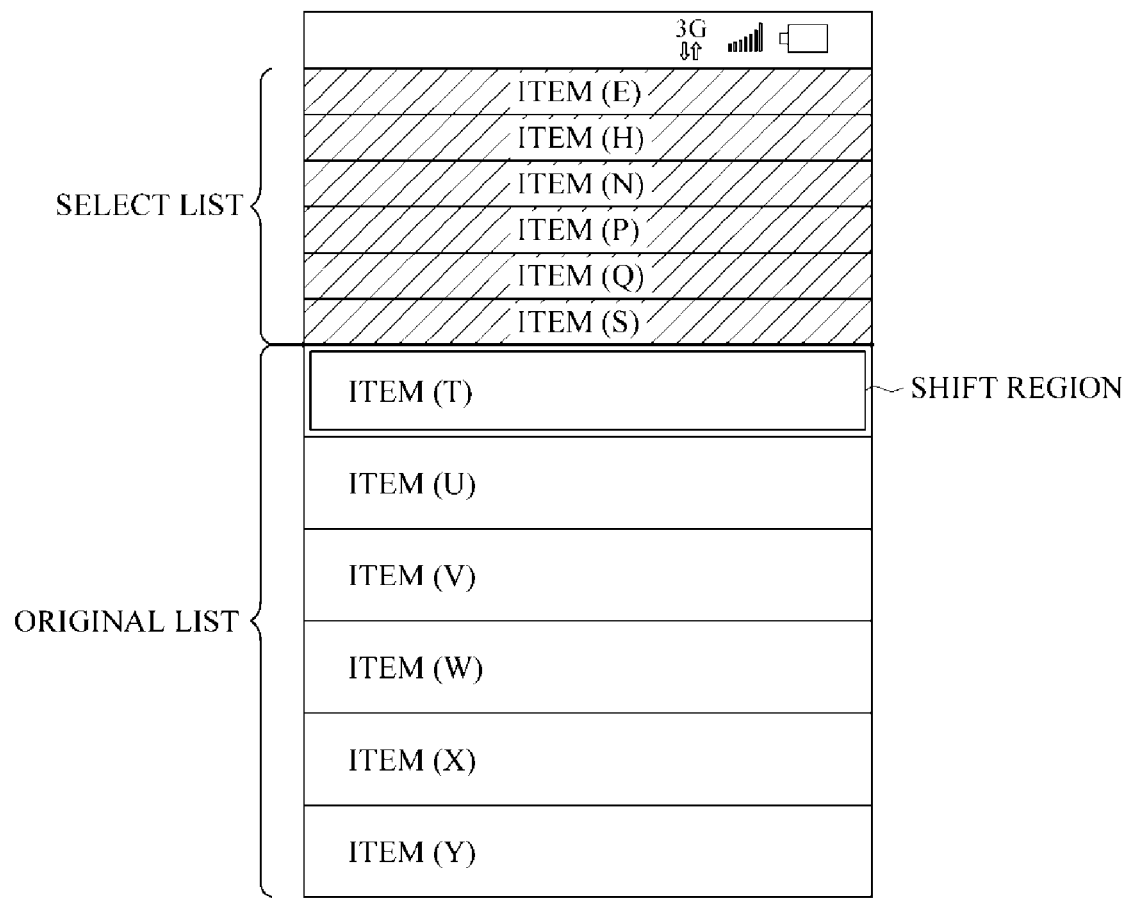
FIG. 4M is a diagram showing where a large amount of selection data is included in the select list and relevant items are displayed in a reduced size according to an exemplary embodiment of the present invention.

Further, the size of each item of the selection list may be reduced, such that some or all of the selection data can be displayed on the touch screen. FIG. 4K is a diagram showing a display state of the touch screen on which selection data is being shifted to the select list in the state of FIG. 4H (i.e., the state where the size of the select list may be increased) according to an exemplary embodiment of the present invention. FIG. 4L and FIG. 4M are diagrams showing a display state of the touch screen on which the selection data is shifted to the select list in the state of FIG. 4H according to an exemplary embodiment of the present invention. FIG. 4L shows a case where a piece of selection data is added as compared to the case of FIG. 4H, and FIG. 4M shows a case where three pieces of selection data are added as compared to the case of FIG. 4H.

Referring to FIG. 4K, if the items of the original list in FIG. 4H are scrolled up and item N corresponding to the selection data reaches the shift region, item N may be shifted to the select list. Accordingly, the size of some or each of the items included in the select list may be gradually reduced. If item N is completely shifted to the select list, the size of some or each of the items may be reduced by approximately ¾ so that a total of 4 items can be displayed in the select list as shown in FIG. 4L. If the original list is continuously scrolled and two additional selection data are shifted to the select list, three selection data are added as compared to the case of FIG. 4H, as shown in FIG. 4M. Accordingly, the size of some or each item may be reduced by approximately ½ so that a total of 6 items can be displayed in the select list.

If the number of selection data included in the select list is larger than a reference value, the above two display methods may be used simultaneously. For example, if the number of selection data included in the select list is larger than the reference value, the item size of the select list may be reduced so that all of the select data can be displayed, as shown in FIG. 4L or FIG. 4M. If the number of selection data included in the select list is larger than the reference value, a portion of the selection data may be displayed so that the items of the select list can be scrolled. The criterion for discriminating between the former display method and the latter display method may be randomly determined in consideration of the user's readability of the selection data or system capability of displaying the data. That is, as the number of selection data included in the select list increases, the size of a unit item may be reduced to be displayed. Herein, the size of the item may be reduced to the extent that the selection data may be readable to a user, or not difficult to recognize the selection data. If the number of selection data increases further, the items may be displayed so that the items of the select list may also be scrollable.

Meanwhile, after the select list is created in one region of the touch screen to be discriminated from the original list as a result of step 106, that is, if at least one selection data is included in the select list, the select list may always be displayed on the touch screen together with the original list. Further, the select list may be displayed on the touch screen at specific moments in time. For example, if the original list is being scrolled, the select list may be activated and displayed on the touch screen, and if the original list is not being scrolled, the select list may be deactivated so that the select list may not be displayed on the touch screen. Accordingly, the original list may be displayed on the touch screen in a large size if the user examines in detail the item included in the original list, while displaying both the original list and the select list on the touch screen simultaneously.

Figure 4N:
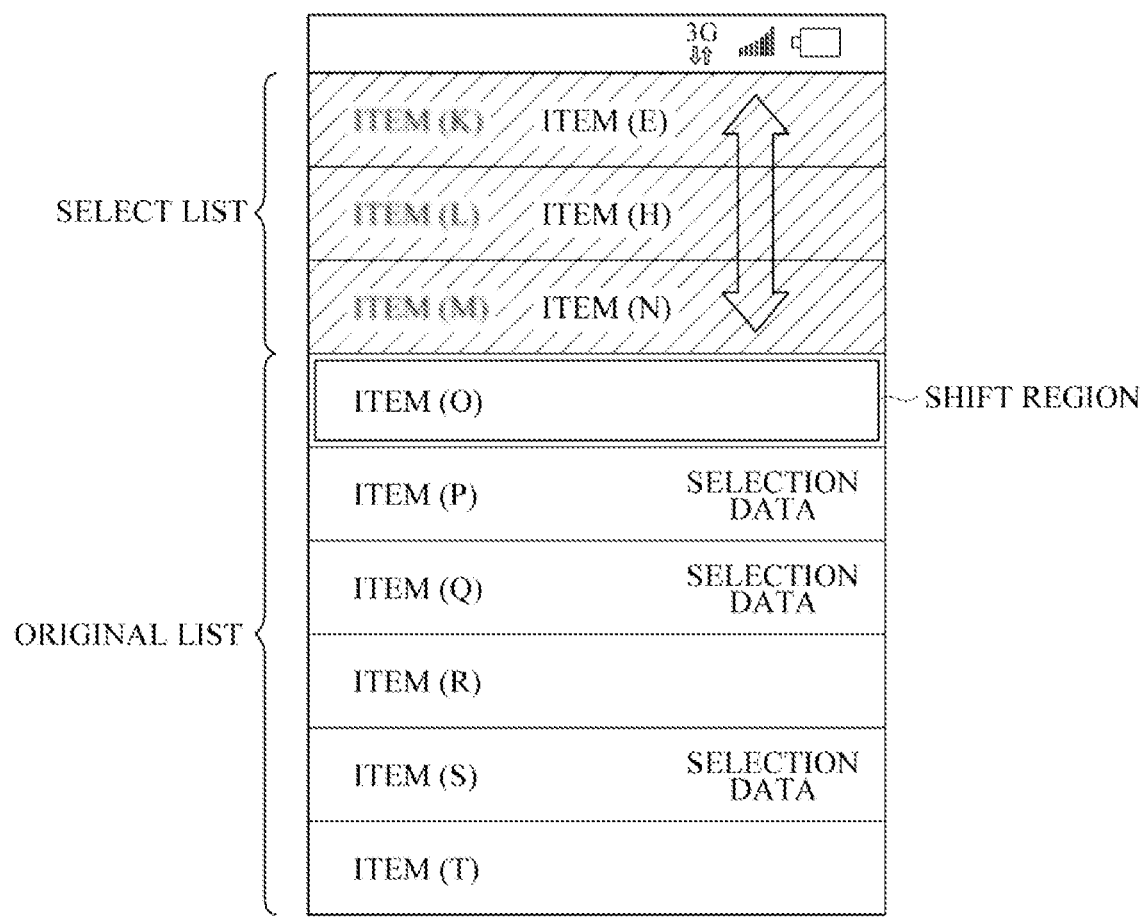
FIG. 4N is a diagram showing where the select list is semitransparently displayed on the touch screen according to an exemplary embodiment of the present invention.

The select list may be opaquely displayed on the touch screen to be discriminated from the original list. The select list may be transparently or semitransparently displayed, so that a portion of the original list can be viewed at the position of the select list. FIG. 4N is a diagram showing where the select list is semitransparently displayed on the touch screen according to an exemplary embodiment of the present invention. Referring to FIG. 4N, the original list, specifically a portion of the items of the original list scrolled and deviated from the region of the original list of the touch screen, may be displayed on the touch screen as if located under the select list. Accordingly, the item scrolled and deviated from the region of the original list of the touch screen may be displayed as if located under the select list, so that the effect of the original list being scrolled can be visually realized through the touch screen.

Referring back to FIG. 2, if it is determined in step 105 that the item present in the shift region is not selection data, step 104 may be repeatedly performed or the data selection operation may be terminated. In the former case, for example, a touch input with directionality is continuously inputted from the user, and also the item not yet displayed on the touch screen is left, among the data included in the original list. In this case, if a touch input is detected from the user, the items of the original list are scrolled in the same direction as the touch input direction (104). Step 105 of determining whether the item located in the shift region as a result of the scroll may be again performed. On the other hand, in the latter case, the item not yet displayed on the touch screen is not left, among the data included in the original list.

After step 106 is performed, that is, if the item present in the shift region is determined to be selection data, the relevant selection data may be shifted to the select list. Although not illustrated, after the select data is shifted to the select list, a determination of whether a touch input in a first direction is or remains detected or a touch input in an opposite direction is detected may be made. If a touch input in the first direction remains detected, a determination of whether an item not yet displayed on the touch screen is left among the data included in the original list may be made (107). Alternatively, if a touch input in an opposite direction is detected, the operation control method proceeds to operation 111 of FIG. 3, which will be described more in detail below with reference to FIG. 3.

In step 107, if it is determined that the item not yet displayed on the touch screen is left, among the data included in the original list, and a touch and drag input is detected from the user, an operation following step 104 of scrolling the items of the original list in the input direction may be performed. On the other hand, if the item not yet displayed on the touch screen is not left, among the data included in the original list, or if an input is not detected from the user, the data classification operation may be terminated.

Figure 3:
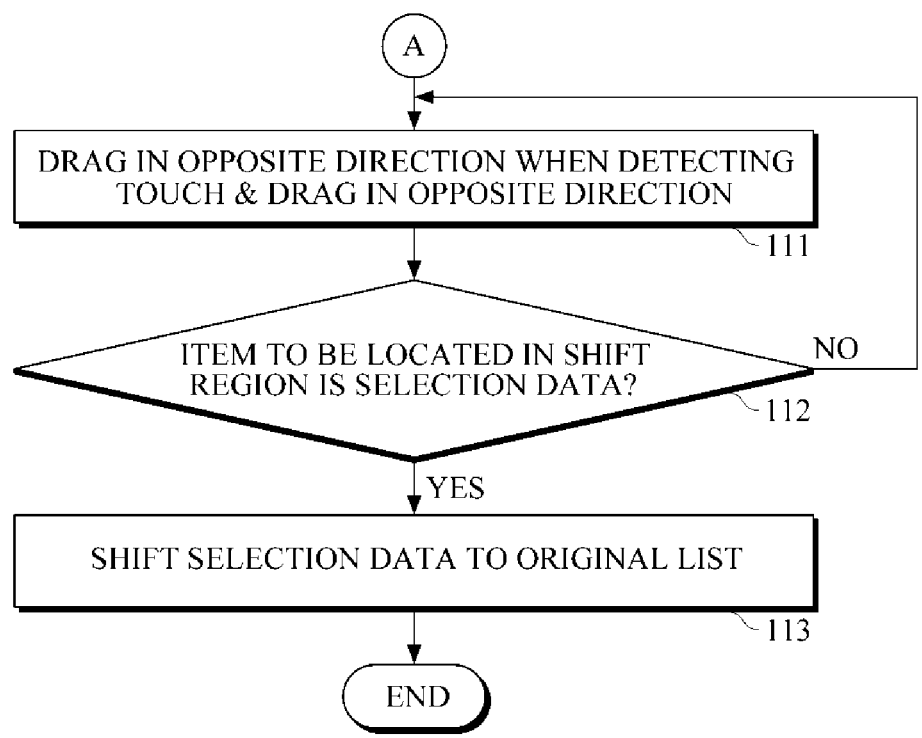
FIG. 3 is a flow chart showing a method for controlling an operation of the mobile device according to an exemplary embodiment of the present invention.

FIG. 3 is a flow chart showing a method for controlling an operation of the mobile device according to an exemplary embodiment of the present invention. The operation control method shown in FIG. 3 may be a process performed after step 106 of FIG. 2, but is not limited thereto. After step 106 of FIG. 2, one or more pieces of selection data may be included in the select list and displayed on the touch screen.

Referring to FIG. 3, if a touch input (e.g., touch and drag motion) with directionality with respect to the original list is detected from the user through the touch screen, the items of the original list are scrolled in the same direction as the touch input direction (111). Further, the drag direction of input from the user in this step may be opposite to the drag direction in step 104 of FIG. 3, and the scroll direction of the items of the original list may also be opposite to the scroll direction of the items of the original list in step 104. This step may be the case where the user scrolls the items of the original list in the opposite direction while or after classifying the data while scrolling the items of the original list.

For example, if a touch input having downward directionality on the touch screen is detected, the mobile device scrolls down the items of the original list. As a result, some or the entire original list may be shifted downward, so that a portion of the lower items may become hidden or removed from the touch screen and as one or more new items appear in the original list of the touch screen. In this case, the newly appeared items may be the items that have been hidden or removed from the original list of the touch screen by the up scroll motion input.

Figure 5A:
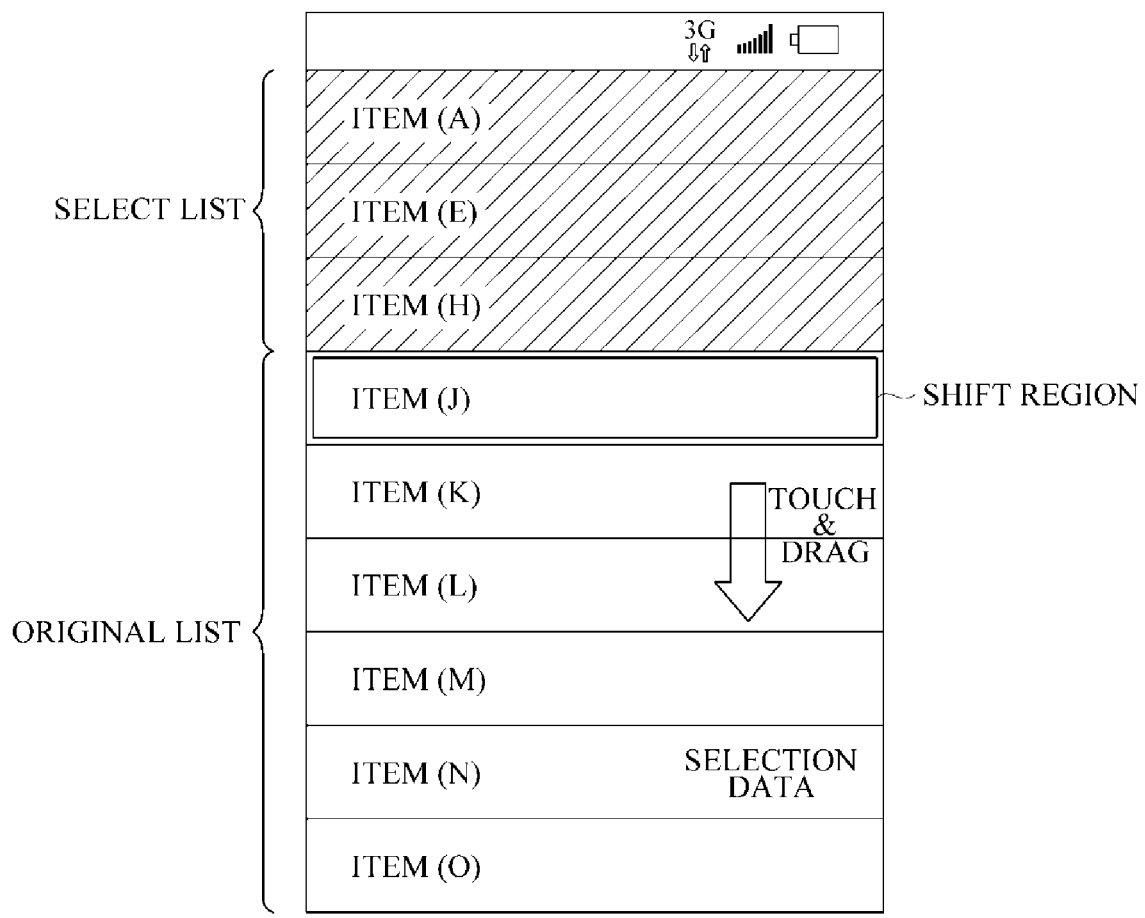
FIG. 5A is a diagram showing a display state of the touch screen of FIG. 4H on which a downward touch is input according to an exemplary embodiment of the present invention.

FIG. 5A is a diagram showing a display state of the touch screen of FIG. 4H on which a downward touch is input according to an exemplary embodiment of the present invention.

Referring to FIG. 5A, it can be seen that the original list is scrolled down, so that a portion of the lower item (i.e., item P) becomes hidden or removed from the touch screen and a new item (i.e., item J) appears at the upper portion of the original list displayed on the touch screen. In an example, there may be various methods to implement how the items hidden or removed from the touch screen may be displayed and managed. Further, there may be various methods to implement how the new item appearing on the touch screen may be stored and displayed.

Referring back to FIG. 3, it may be determined whether a next item to be displayed on the shift region of the touch screen is an item shifted to the select list, that is, selection data (112). If the item to be displayed on the shift region is the selection data, the corresponding selection data is shifted from the select list to the original list and displayed on the touch screen (113). As described above, the shift region may be a region of the touch screen where the selection data present in the original list may be shifted to the select list of the touch screen. According to exemplary embodiments of the present invention, the shift region may also be a region of the touch screen where the selection data displayed in the select list may be returned from the original list to the original position.

Figure 5B:
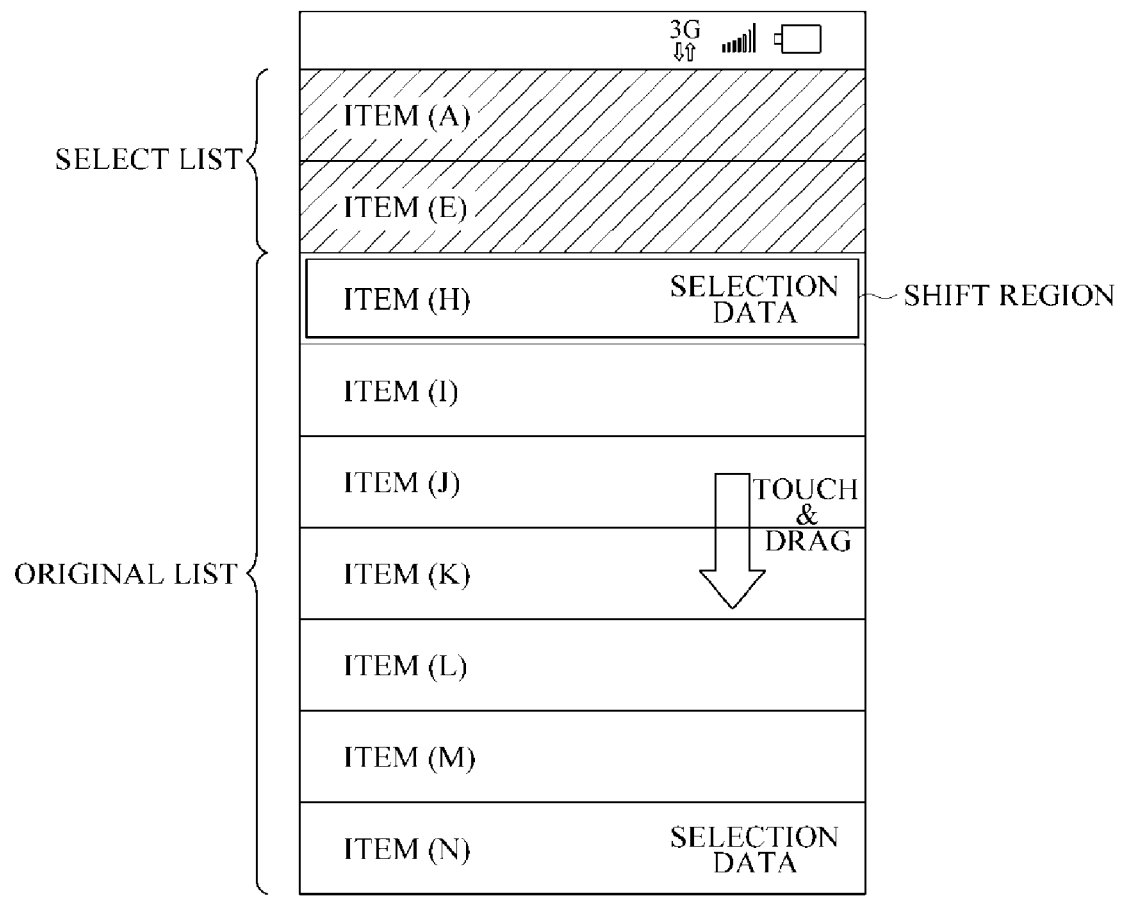
FIG. 5B is a diagram showing a display state of the touch screen of FIG. 5A on which a downward touch is input and then an item of the select list is shifted to the original list according to an exemplary embodiment of the present invention.

FIG. 5B is a diagram showing a display state of the touch screen of FIG. 5A on which a downward touch is input, and then an item of the select list is shifted to the original list according to an exemplary embodiment of the present invention.

Referring to FIG. 5B, it can be seen that the original list is scrolled down, so that one selection data (e.g., item H) located at the select list becomes hidden or removed from the select list, may be included in the original list and displayed on the touch screen.

Referring back to FIG. 3, if it is determined in step 112 that a next item to be displayed in the shift region is not selection data, step 111 may be repeatedly performed. In an example, a touch input with directionality may be continuously inputted by the user, and the items to be displayed in the original list of the touch screen in the scroll direction may be left. In this case, if a touch input with directionality is detected from the user, the items of the original list are scrolled in the same direction as the touch input direction (111). Step 112 of determining whether a next item to be located in the shift region as a result of the scroll may be again performed. Further, the process may be terminated even if a touch input with directionality may continuously be inputted from the user. In this case, due to the scrolling motion, the item to be scrolled and displayed in the original list of the touch screen may not be left.

Exemplary embodiments of the present invention can be implemented as computer readable codes in a computer readable record medium. Computer readable record medium includes all types of record media in which computer readable data is stored. Examples of computer readable record medium include a ROM, a RAM, a CD-ROM, a magnetic tape, a floppy disk, and optical data storage. Computer readable record medium may be distributed to computer systems over a network, in which computer readable codes may be stored and executed in a distributed manner.

As apparent from the above description, according to exemplary embodiments of the present invention, the items of the original list are selected in real time according to conditions set by the user. In the process of scrolling, the items of the original list can be automatically shifted to the select list for display on the touch screen. Accordingly, the user does not need to directly perform an item selecting action on the touch screen. Further, according to the embodiment of the present invention, both the original list and the select list can be scrollably displayed and can be displayed in various forms. Thus, convenience for the user can be improved.

It will be apparent to those of ordinary skill in the art that various modifications can be made to the exemplary embodiments of the invention described above. However, as long as modifications fall within the scope of the appended claims and their equivalents, they should not be misconstrued as a departure from the scope of the invention itself.

What is claimed is:

1. A method for displaying lists on a mobile device, comprising:
    displaying a first list comprising a plurality of items;
    setting a selection condition for at least one of the items of the first list;
    determining whether the at least one of the items of the first list is a selection data corresponding to the selection condition;
    scrolling the first list in response to an input received by the mobile device;
    detecting whether the at least one of the items of the first list is located in a shift region;
    shifting the at least one of the items of the first list located in the shift region to a second list if the at least one of the items of the first list located in the shift region is determined to be the selection data; and
    hiding the at least one of the items of the first list located in the shift region if the at least one of the items of the first list located in the shift region is determined not to be the selection data,
    wherein the at least one of the items of the first list is moved to be located in the shift region based on the scrolling of the first list, and
    wherein the first list and the second list are simultaneously displayed on the mobile device.

2. The method of claim 1, wherein the shifting the at least one of the items of the first list located in the shift region to the second list comprises adding another item to the second list in addition to the items present in the second list.

3. The method of claim 1, wherein the second list is displayed as a stationary list or a scrollable list.

4. The method of claim 1, wherein size of the at least one of the items of the first list displayed on the mobile device is based on at least one of a content of an item, readability of item description, and a user configuration.

5. The method of claim 1, wherein size of at least one of the items in the second list displayed on the mobile device is based on at least one of content of an item, readability of item description, and a user configuration.

6. The method of claim 1, wherein the second list is displayed transparently or semitransparently over the first list.

7. The method of claim 1, wherein the second list is hidden or shown based on whether the first list is scrolled.

8. The method of claim 1, wherein the selection data of the first list is shifted to the second list if the selection data is scrolled to the shift region in a first direction.

9. The method of claim 8, wherein the selection data of the second list is shifted back to the first list if the selection data is scrolled to the shift region in a second direction.

10. The method of claim 1, wherein a location of the shift region is determined based on the scroll direction of the first list.

11. The method of claim 1, wherein the at least one of the items of the first list is automatically determined to be the selection data based on the set selection condition.

12. A mobile device to display lists, comprising:
    a memory to store a plurality of items of a first list;
    a touch screen to display the first list comprising the plurality of items, to display a second list comprising at least one of a selection data, and to receive an input to scroll the first list; and
    a controller to set a selection condition of at least one of the items of the first list, to determine whether the at least one of the items of the first list is a selection data corresponding to the selection condition, to detect whether the at least one of the items of the first list is located in a shift region, to shift the at least one of the items of the first list located in the shift region to a second list if the at least one of the items of the first list located in the shift region is determined to be the selection data, and to hide the at least one of the items of the first list located in the shift region if the at least one of the items of the first list located in the shift region is determined not to be the selection data,
    wherein the at least one of the items of the first list is moved to be located in the shift region based on the scrolling of the first list, and
    wherein the first list and the second list are simultaneously displayed on the mobile device.

13. The mobile device of claim 12, wherein the second list is displayed as a stationary list or a scrollable list.

14. The mobile device of claim 12, wherein size of the at least one of the items of the first list displayed on the mobile device is based on at least one of content of an item, readability of item description, and a user configuration.

15. The mobile device of claim 12, wherein size of the at least one of the selection data of the second list displayed on the mobile device is based on at least one of content of an item, readability of item description, and a user configuration.

16. The mobile device of claim 12, wherein entire region of the first list is the shift region if the items comprised in the first list are scrolled such that last item of the first list is displayed on the touch screen.

17. The mobile device of claim 12, wherein the second list is hidden or shown based on whether the first list is scrolled.

18. The mobile device of claim 12, wherein the selection data of the first list is shifted to the second list if the selection data is scrolled to the shift region in a first direction.

19. The mobile device of claim 18, wherein the selection data of the second list is shifted back to the first list if the selection data is scrolled to the shift region in a second direction.

20. A method for displaying lists on a mobile device, comprising:
    displaying, on the mobile device, a first list comprising a first item and a second list comprising a second item;
    setting a selection condition;
    scrolling the first list in a first direction based on an input received by the mobile device;
    detecting whether the first item is located in a shift region;
    shifting the first item located in the shift region to the second list for displaying both the first item and the second item in the second list if the first item corresponds to the selection condition; and
    hiding the first item located in the shift region if the first item is located in the shift region and determined not to correspond to the selection condition,
    wherein the first item is moved to be located in the shift region based on the scrolling of the first list, and
    wherein the first item shifted to the second list is shifted back to the first list if the first item of the second list is scrolled to the shift region in a second direction.

* * * * *